July 20, 1965 L. E. POTTER 3,196,368

WIDE ANGLE PHASE SHIFTER OR MODULATOR

Filed Dec. 26, 1961

INVENTOR.
LOUIS E. POTTER
BY Edward J. Norton
Attorney

United States Patent Office 3,196,368

Patented July 20, 1965

3,196,368

WIDE ANGLE PHASE SHIFTER OR MODULATOR

Louis E. Potter, Merchantville, N.J., assignor to Radio Corporation of America, a corporation of Delaware Filed Dec. 26, 1961, Ser. No. 161,846
5 Claims. (Cl. 332—30)

Figure 1:
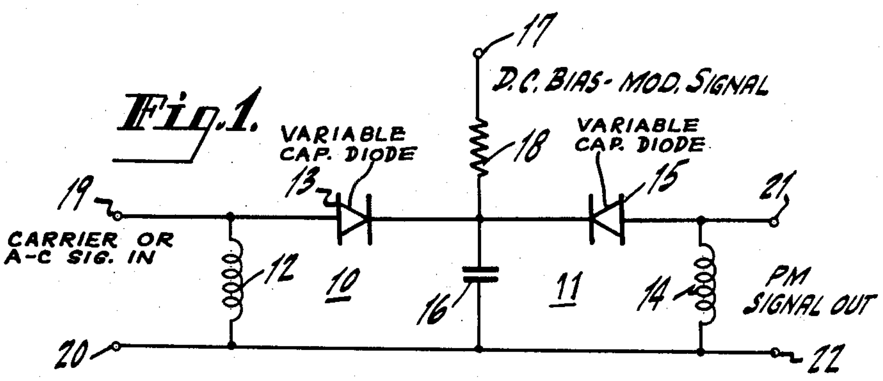

This invention relates generally to wide angle phase shifting circuits and more particularly to an improved, wide angle phase shifting circuit employing the capacity of reverse biased junction diodes as variable reactance elements, and to signal phase modulation networks employing such circuits.

It is an object of the invention to provide an improved circuit arrangement for obtaining large angle phase shift of a signal applied thereto with a small variation in signal output level.

A further object is to provide an improved wide angle phase modulator.

Another object is to provide a simplified and improved phase modulator including variable capacitance junction devices for obtaining wide angle phase modulation in response to small modulating signals.

Still another object is to provide a simplified and improved wide angle phase modulator including variable capacitance junction diodes for producing a phase modulated wave having an energy distribution substantially independent of the modulating frequency and therefore similar in characteristics to a frequency-modulated wave.

The foregoing and other objects are accomplished in one embodiment of the invention by a circuit arrangement including a tuned resonant circuit or primary formed by an inductance across which a first variable capacitance junction device is coupled. The circuit arrangement also includes a second tuned resonant circuit or secondary formed by a further inductance having a second variable capacitance junction device coupled thereacross. A capacitor serves to couple the primary and secondary.

A reverse bias voltage is applied to the junction devices to determine (that is, control) the effective capacity thereof and to thereby tune both the primary and secondary to the frequency of the carrier as signal energy to be shifted in phase. An audio or other suitable modulating signal is applied to the junction devices so as to vary the effective capacitance value of the junction devices as a function of the amplitude of the modulating signal. The resulting detuning of the primary and secondary brings about a corresponding phase shift in the carrier or signal energy fed through the modulator. A wide angle phase shifted or modulated wave for a small modulating signal is derived from across the secondary of the circuit arrangement.

A feature of the embodiment of the invention to be described is that the circuit arrangement employed inherently acts to make the modulating voltage applied to the phase shifting circuit inversely proportional to the modulating frequency. While the speed with which the phase varies (and hence the change in instantaneous frequency) of a phase modulated wave is normally proportional to the modulating frequency, the presence of the inverse function causes a cancellation to take place so that the energy distribution in the output phase modulated wave of the invention is independent of the modulating frequency.

Figure 2:
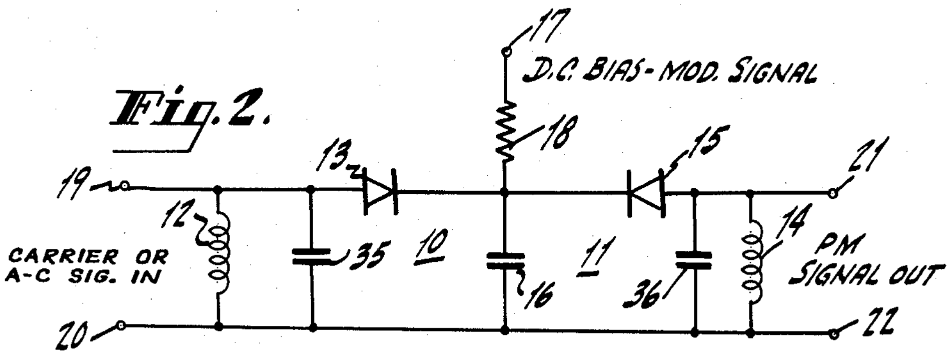

A more detailed description of the invention will now be given in connection with the accompanying drawing, in which:

FIGURE 1 is a schematic diagram of a phase modulator constructed according to one embodiment of the invention; and FIGURE 2 is a schematic diagram of a phase modulator constructed according to a further embodiment of the invention.

The same elements appearing in the different figures of the drawing have been given the same reference numerals for ease of description.

A double tuned circuit arrangement is shown in FIGURE 1 as including a primary 10 and a secondary 11. The primary 10 includes an input winding or inductor 12. A first variable capacitance device, such for example as a junction diode 13 is coupled across the inductor 12, and is poled for easy current conduction from anode to cathode in the direction of the arrow.

The secondary 11 includes an output winding or inductor 14. A second variable capacitance device, such as, for example, a junction diode 15, poled for easy current conduction from anode to cathode in the direction of the arrow, is coupled across the inductor 14. A fixed capacitor 16 is connected in series with the junction diode 13 and inductor 12 of the primary 10, and in series with the junction diode 15 and inductor 14 of the secondary 11, to provide capacitive coupling between the primary 10 and secondary 11.

The circuit arrangement shown in FIGURE 1 may be seen to include a tuned primary 10 and tuned secondary 11. The variable elements of the tuned circuits 10 and 11 are the junction diodes, the capacitive reactance of which varies as a function of a reverse bias voltage applied to the diodes. The junction diodes 13 and 15 at all times during operation have reverse bias applied thereto so that they act as a variable capacitor rather than rectifying as an ordinary diode. A positive direct current (D.C.) voltage plus an audio or other modulating signal is applied to the junction point of capacitor 16 and the cathodes of junction diodes 13 and 15 over a path including a terminal 17 and a resistor 18.

A carrier or other alternating current signal energy which is to be phase modulated or otherwise shifted in phase is applied across inductor 12 via terminals 19 and 20, the phase modulated output wave being taken from across inductor 14 via terminals 21 and 22.

The diodes 13 and 15 are preferably of the type formed by the junction of two dissimilar semiconductors. For example, the diodes 13 and 15 may consist of a cylinder of indium alloyed onto a wafer of germanium and mounted with low resistance connections. Junction diodes using other semiconductor materials are available. If a diode, as above, is biased in the reverse (non-conduction) direction, the mobile charge carriers are moved away from the junction, leaving uncompensated fixed charges in a region near the junction. The width, and hence, the electrical charge of this region (space-charge layer) depends on the applied voltage, giving rise to a junction transition capacitance. The junction diode transition capacitance is inversely proportional to the effective width of the junction, and since the effective junction width is voltage dependent, the capacitance afforded by the junction diode is voltage dependent. In other words, a semiconductor junction when biased in the reverse or non-conduction direction is a capacitance which can be varied by varying the bias voltage. The junction diodes 13 and 15 may, by way of example, be of the type defined in the art as having a capacitance in the range of 56 micromicrofarads when reversed biased at 4 volts.

In the operation of the embodiment of the invention shown in FIGURE 1, a direct current bias voltage of +4 volts, for example, is applied to the cathodes of junction diodes 13 and 15 via the terminal 17 and resistor 18. The level of bias voltage and therefore the capacitance value of junction diodes 13 and 15 is determined according to the characteristics of the junction diodes used and the other circuit values so that both the primary 10 and the secondary 11 are tuned to the frequency of the signal energy or carrier signal applied to terminals 19 and 20, with no modulation signal present. Inductors 12 and 14 are preferably of the same inductance value. The capacitance of junction diode 13 when reverse biased should be the same as that of junction diode 15 in response to the reverse bias voltage. If the characteristics of the junction diodes available for use are not the same, the junction diodes may be matched by the use of trimmer capacitors connected in parallel with the respective junction diodes. By the use of trimmer capacitors of appropriate value, junction diode 13 may be made effectively identical to junction diode 15, and the total capacitance provided by the diodes determined according to the particular application.

An audio or other modulating signal having a peak-to-peak amplitude of 2.0 volts, for example, is applied from a suitable source, not shown, along with the direct current bias voltage to terminal 17. The capacitance of junction diodes 13 and 15 varies according to the change in the reverse bias voltage applied thereto. As the level of the reverse bias voltage changes according to the amplitude of the modulating signal, a corresponding change in the capacitance of junction diodes 13 and 15 occurs.

The peak-to-peak amplitude of the modulating signal is controlled so that the capacitance of junction diodes 13 and 15 is caused to vary and to detune the primary 10 and secondary 11 above and below center frequency to a point where the response falls to say 70 percent of the center frequency response within the substantially linear portion of the phase response. As the response falls in one direction, a phase shift occurs in the signal energy corresponding in amount to the fall in response and the characteristic response curve of the circuit arrangement. For a fall in response on the other side of center frequency, a phase shift occurs in the signal energy again corresponding in amount to the fall in response and the characteristic response curve of the circuit arrangement.

By adding the phase shift resulting from the fall in response on both sides of center frequency, the total phase shift is obtained. In a typical application of the invention, described below up to 180° total phase shift can be obtained. Where a modulating signal of greater amplitude resulting in a greater reduction in response is used and where a small amount of non-linearity can be tolerated, a greater total phase shift is possible.

For a relatively small modulating signal resulting in a narrow swing in the capacitance values of junction diodes 13 and 15, a wide angle phase shifted or modulated output is obtained.

At modulating signal frequencies, which may be audio, the capacitance of junction diodes 13 and 15 and capacitor 16 are in parallel. The total capacity in series with the resistor 18 forms an integrating circuit. The resistance is made much higher than the capacitive reactance, and the modulating voltage is the voltage drop across the capacitance. Because of the variation in capacitive reactance with frequency, the modulating voltage applied to the phase modulator is substantially inversely proportional to the modulating signal frequency. While the energy in a phase modulation system is normally distributed in proportion to the modulating frequency, the presence of the inverse function results in a substantially uniform energy distribution and constant amplitude in the output wave at terminals 21 and 22. The output wave will resemble in this regard a frequency-modulated wave free of unwanted amplitude changes.

Variable capacitance junction diodes are for the most part non-linear. For a given change in voltage, a greater change in capacity is obtained at higher capacities than at lower capacities. The low side capacity coupling employed in the arrangement of FIGURE 1 has some compensating effects in that, when the capacitance of junction diodes 13 and 15 is made smaller, the coupling coefficient becomes smaller and results in a narrow bandwidth curve. The narrow band curve in turn requires less capacity change for a given phase shift. In changing the capacity of the diodes in the high capacity direction, the band-width expands and requires more capacity change for a given phase shift.

Where greater linearity is desired, the above compensation effect can be enhanced by connecting part of the tuning capacity directly across the inductors 12 and 14 in the primary 10 and secondary 11, respectively. This circuit arrangement is shown in FIGURE 2. Fixed capacitor 35 is connected across inductor 12, and fixed capacitor 36 is connected across inductor 14.

While the invention is suitable for use as a phase modulator, it is not limited to this application. The invention may be used in any application where it is desired to effect a phase shift in signal energy. The invention will operate in the manner described in response to a control signal applied to terminal 17 to provide large angle phase shift.

In a phase modulator constructed according to the embodiment of the invention given in FIGURE 1 for operation at a signal input frequency of 8.5 megacycles, the following component values are used:

| | |
|---|---|
| Inductors 12, 14 | 2.7 microhenries. |
| Resistor 18 | 100,000 ohms. |
| Capacitor 16 | 2900 micromicrofarads. |
| Junction diodes 13, 15 | 130 micromicrofarads total. |

The capacity per diode 13 and 15 comprises 80 micromicrofarads of fixed capacity and 50 micromicrofarads of variable capacitance from the diode. A positive 4 volts direct current bias voltage plus a modulating signal having a 2.0 volt peak-to-peak amplitude is applied to terminal 17. An output phase modulated wave having a phase shift as great as 180 degrees is obtained.

What is claimed:

1. A phase shifter comprising, in combination, a first inductor, a first variable capacitance junction diode having a first and a second electrode, a capacitor, means to connect the first electrode of said diode to one end of said inductor and the second electrode of said diode to one side of said capacitor, means to connect the other side of said capacitor to the other end of said inductor, a second inductor, a second variable capacitance junction diode having first and second electrodes similar to the respective first and second electrodes of said first diode, means to connect the first electrode of said second diode to one end of said second inductor and to connect the second electrode of said second diode to said one side of said capacitor, means to connect the other end of said second inductor to said other side of said capacitor, means to apply an alternating current input across said first inductor, means to apply a reverse bias varying according to a control signal to the junction point of the second electrodes of said diodes and said capacitor, and means to derive an output signal from across said second inductor shifted in phase according to said control signal.

2. A phase shifter comprising, in combination, a first inductor, a first variable capacitance junction diode, and a capacitor connected in series to form a first tuned circuit, a second inductor, a second variable capacitance junction diode, means to connect said second inductor and said second diode in series with each other and in shunt with said capacitor to form a second tuned circuit, said first and second diodes being connected in said first and second circuits so that an electrode of said first diode is connected to the same electrode of said second diode and to said capacitor, means to apply an alternating current input across said first inductor, a resistor, means to apply a reverse bias voltage varying according to a control signal through said resistor to said same electrodes of said diodes to cause the capacitance of said diodes to be varied by the voltage drop across the capacitance of said diodes and said capacitor in series with said resistor, and means to derive an output signal from across said second inductor shifted in phase according to said control signal.

3. A phase shifter comprising, in combination, a first inductor, a first variable capacitance junction diode having a cathode and an anode, a capacitor, means to connect the anode of said diode to one end of said inductor and the cathode of said diode to one side of said capacitor, means to connect the other side of said capacitor to the other end of said inductor, a second inductor, a second variable capacitance junction diode having a cathode and an anode, means to connect the anode of said second diode to one end of said second inductor and to connect the cathode of said second diode to said one side of said capacitor, means to connect the other end of said second inductor to said other side of said capacitor, means to apply an alternating current input across said first inductor, a resistor, means to apply a reverse bias varying according to a control signal through said resistor to the junction point of the cathodes of said diodes and said capacitor, the capacitance of said diodes and said capacitor along with said resistor forming an integrating circuit, and means to derive an output signal from across said second inductor shifted in phase according to said control signal.

4. A phase modulator comprising, in combination, a first inductor, a first variable capacitance junction diode having a cathode and an anode, a capacitor, means to connect the anode of said diode to one end of said inductor and the cathode of said diode to one side of said capacitor, means to connect the other side of said capacitor to the other end of said inductor, a second inductor, a second variable capacitance junction diode having a cathode and an anode, means to connect the anode of said second diode to one end of said second inductor and to connect the cathode of said second diode to said one side of said capacitor, means to connect the other end of said second inductor to said other side of said capacitor, means to apply a carrier across said first inductor, a resistor, means to apply a reverse bias varying according to an audio modulating signal through said resistor to the junction point of the cathodes of said diodes and said capacitor, the capacitance of said diodes and said capacitor in series with said resistor forming an integrating circuit so that the modulating voltage is developed across said capacitance, and means to derive an output signal from across said second inductor shifted in phase according to said modulating signal.

5. A phase shifter comprising, in combination, a first inductor, a first variable capacitance junction diode having a first and a second electrode, a capacitor, means to connect the first electrode of said diode to one end of said inductor and the second electrode of said diode to one side of said capacitor, means to connect the other side of said capacitor to the other end of said inductor, a second inductor, a second variable capacitance junction diode having first and second electrodes similar to the respective first and second electrodes of said first diode, means to connect the first electrode of said second diode to one end of said second inductor and to connect the second electrode of said second diode to said one side of said capacitor, means to connect the other end of said second inductor to said other side of said capacitor, means to apply an alternating current input across said first inductor, a resistor, means to apply a reverse bias varying according to a control signal through said resistor to the junction point of the second electrodes of said diodes and said capacitor, a second capacitor forming a part of the tuning capacity connected directly across said first inductor and a third capacitor forming a part of the tuning capacity connected directly across said second inductor, and means to derive an output signal from across said second inductor shifted in phase according to said control signal.

References Cited by the Examiner

UNITED STATES PATENTS 3,020,493 2/62 Carroll ---------------- 332—16

OTHER REFERENCES

Electrical Manufacturing Mag., December 1954, "Voltage-Sensitive Capacitors," pages 83–88.

ROY LAKE, *Primary Examiner.*

ARTHUR GAUSS, *Examiner.*